(12) United States Patent
Harper et al.

(10) Patent No.: US 9,719,477 B2
(45) Date of Patent: Aug. 1, 2017

(54) USING A DC OR AC GENERATOR AS A STARTER WITH FAULT DETECTION

(71) Applicant: Textron Inc., Providence, RI (US)

(72) Inventors: Joseph Lowell Harper, Waxhaw, NC (US); Osahenrhunwen Erhun Iyasere, Charlotte, NC (US)

(73) Assignee: Textron Inc., Providence, RI (US)

( * ) Notice: Subject to any disclaimer, the term of this patent is extended or adjusted under 35 U.S.C. 154(b) by 88 days.

(21) Appl. No.: 14/100,481

(22) Filed: Dec. 9, 2013

(65) Prior Publication Data

US 2015/0159614 A1 Jun. 11, 2015

(51) Int. Cl.
| | | |
|---|---|---|
| *F02N 11/04* | (2006.01) | |
| *F02N 11/08* | (2006.01) | |
| *B60K 6/46* | (2007.10) | |
| *B60L 11/02* | (2006.01) | |
| *B60W 20/50* | (2016.01) | |

(52) U.S. Cl.
CPC ............... *F02N 11/04* (2013.01); *B60K 6/46* (2013.01); *B60L 11/02* (2013.01); *B60W 20/50* (2013.01); *F02N 11/0851* (2013.01); *F02N 11/0862* (2013.01); *B60W 2510/0657* (2013.01); *Y02T 10/6217* (2013.01)

(58) Field of Classification Search
CPC .......................... F02N 11/04; F02N 11/0859
USPC ................................................... 123/179.28
See application file for complete search history.

(56) References Cited

U.S. PATENT DOCUMENTS

| | | |
|---|---|---|
| 4,459,536 A | 7/1984 | Wirtz |
| 4,862,009 A | 8/1989 | King |
| 5,285,862 A | 2/1994 | Furutani et al. |
| 5,309,081 A | 5/1994 | Shah et al. |
| 5,550,445 A | 8/1996 | Nii |
| 5,751,137 A | 5/1998 | Kiuchi et al. |

(Continued)

FOREIGN PATENT DOCUMENTS

| | | |
|---|---|---|
| AT | 229435 B | 9/1963 |
| DE | 1463618 A1 | 4/1969 |

(Continued)

OTHER PUBLICATIONS

European Search Report, EP14196531.9, dated Jun. 22, 2015.

(Continued)

*Primary Examiner* — Kevin A Lathers
(74) *Attorney, Agent, or Firm* — Polster Lieder (57) ABSTRACT

A power generation and starting device for a utility vehicle having a battery source capable of storing electrical energy, a logic/driver module operably coupled to the battery source and capable of outputting power to a drive system of the utility vehicle, an internal combustion engine capable of outputting a mechanical driving force, and a generator system operably coupled to the internal combustion engine and electrically coupled to the logic/driver module. The generator system is capable of operating as a generator in response to the mechanical driving force of the internal combustion engine, thereby outputting electrical energy to the logic/driver module. The generator is further capable of operating as an electric motor in response to input of electrical energy from the logic/driver module to drive the internal combustion engine during startup of the internal combustion engine.

12 Claims, 4 Drawing Sheets

(56) References Cited

U.S. PATENT DOCUMENTS

| | | | |
|---|---|---|---|
| 5,786,640 | A | 7/1998 | Sakai et al. |
| 5,847,520 | A | 12/1998 | Theurillat et al. |
| 6,005,297 | A | 12/1999 | Sasaki et al. |
| 6,018,199 | A | 1/2000 | Shiroyama et al. |
| 6,018,694 | A | 1/2000 | Egami et al. |
| 6,048,289 | A | 4/2000 | Hattori et al. |
| 6,073,713 | A | 6/2000 | Brandenburg et al. |
| 6,119,799 | A | 9/2000 | Morisawa et al. |
| 6,205,379 | B1 | 3/2001 | Morisawa et al. |
| 6,260,644 | B1 | 7/2001 | Otsu |
| 6,274,943 | B1 | 8/2001 | Hasegawa et al. |
| 6,294,843 | B1 | 9/2001 | Kato et al. |
| 6,338,391 | B1 | 1/2002 | Severinsky et al. |
| 6,445,982 | B1 | 9/2002 | Swales et al. |
| 6,580,178 | B1 | 6/2003 | Gale et al. |
| 6,724,100 | B1 | 4/2004 | Gabriel |
| 7,345,859 | B2 * | 3/2008 | Andersen .............. H02J 7/0029 |
| | | | 361/23 |
| 7,780,562 | B2 | 8/2010 | King et al. |
| 7,866,425 | B2 | 1/2011 | King et al. |
| 2002/0055810 | A1 | 5/2002 | Nakasako et al. |
| 2003/0033060 | A1 | 2/2003 | Okoshi |
| 2004/0080163 | A1 * | 4/2004 | Blackburn et al. ......... 290/37 A |
| 2005/0116474 | A1 | 6/2005 | Edelson |
| 2006/0127704 | A1 | 6/2006 | Raiser |
| 2006/0232238 | A1 | 10/2006 | Horii |
| 2009/0277704 | A1 | 11/2009 | Yamaguchi |
| 2010/0127665 | A1 | 5/2010 | Mitsutani |
| 2011/0012422 | A1 | 1/2011 | Neher |
| 2012/0245777 | A1 | 9/2012 | Goto et al. |
| 2013/0124028 | A1 | 5/2013 | Ang |
| 2013/0166122 | A1 | 6/2013 | Iino |
| 2013/0166153 | A1 * | 6/2013 | Ito ........................... F02D 29/02 |
| | | | 701/45 |
| 2013/0191012 | A1 | 7/2013 | Hirotsu et al. |
| 2013/0307329 | A1 | 11/2013 | Ito et al. |
| 2014/0055094 | A1 | 2/2014 | Takagi et al. |

FOREIGN PATENT DOCUMENTS

| | | |
|---|---|---|
| DE | 102008000904 A1 | 10/2009 |
| KR | 10-0867792 B1 | 11/2008 |

OTHER PUBLICATIONS

European Search Report, EP14195192.1, dated Jun. 22, 2015.
PCT Search Report, PCT US 2014/067575, mailed Mar. 20, 2015.
European Search Report, EP14196533.5, dated Jun. 29, 2015.

* cited by examiner

USING A DC OR AC GENERATOR AS A STARTER WITH FAULT DETECTION

FIELD

The present disclosure relates to generators and, more particularly, relates to using an AC induction motor with a controller as a generator to produce a regulated power output in a utility vehicle.

BACKGROUND

This section provides background information related to the present disclosure which is not necessarily prior art.

Generally, it is known that conventional generators can be used to generate a power output. In some conventional systems, the generator uses a permanent magnet-type direct current (DC) motor, with full wave rectification, to generate the power output. During operation, in order to increase the power output, the revolutions per minute (RPM) of these permanent magnet-type DC motors must also be increased.

Unfortunately, when using such DC motors to generate power output in a utility vehicle application, the need for increased power output of the DC motor may result in a commensurate decrease in fuel efficiency of the utility vehicle. That is, utility vehicles, such as turf care vehicles, golf carts, and off-road vehicles other than automotive vehicles, often employ a drive system having an internal combustion engine that is mounted in series with a DC motor via a mechanical coupler to generate power output. The power output can then be used to provide motive force and to power other vehicle systems, such as controllers, navigation, power takeoffs, and the like. Consequently, in order to increase the available power output of the drive system when using a DC motor, the RPM of the internal combustion engine must be increased to increase the RPM of the DC motor to thereby increase the power output. Thus, it should be understood that any increase in power output of the DC motor is necessarily related to an increase in fuel consumption of the internal combustion engine.

Moreover, such conventional generator arrangements fail to compensate for regeneration power from braking. That is, as described herein, the power output of DC motors is dependent upon the RPM thereof, therefore, in order to obtain increased power output, the RPM must increase. However, during regeneration from braking, the RPM of the DC motor is increased as a result of the braking process of the utility vehicle. This increase in RPM of the DC motor will result in an increase in voltage if the load is not also increased simultaneously. A commensurate load increase is not necessarily associated with every braking situation and thus can result in a disadvantageous increase in voltage. Moreover, it is often important to maintain a stable voltage to ensure proper operation of coupled, on-board electronics. On the other hand, the cost of power generation can be significant and due to the ongoing demand for improved energy production efficiencies, it is often desirable to harness power sources where available, such as power regeneration via braking.

Accordingly, there exists a need in the relevant art to provide a power generation system for use in a utility vehicle whereby the power output of the power generation system can be varied without requiring a change in RPM of an associated internal combustion engine. Further, there exists a need in the relevant art to provide a power generation system that is capable of maintaining a predetermined power output and/or voltage irrespective of an associated regeneration during braking. Still further, there exists a need in the relevant art to overcome the disadvantages of the prior art.

SUMMARY

This section provides a general summary of the disclosure, and is not a comprehensive disclosure of its full scope or all of its features.

According to principles of the present teachings, a power generation and starting device for a utility vehicle is provided having a battery source capable of storing electrical energy, a logic/driver module operably coupled to the battery source and capable of outputting power to a drive system of the utility vehicle, an internal combustion engine capable of outputting a mechanical driving force, and a generator system operably coupled to the internal combustion engine and electrically coupled to the logic/driver module. The generator system is capable of operating as a generator in response to the mechanical driving force of the internal combustion engine, thereby outputting electrical energy to the logic/driver module. The generator is further capable of operating as an electric motor in response to input of electrical energy from the logic/driver module to drive the internal combustion engine during startup of the internal combustion engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
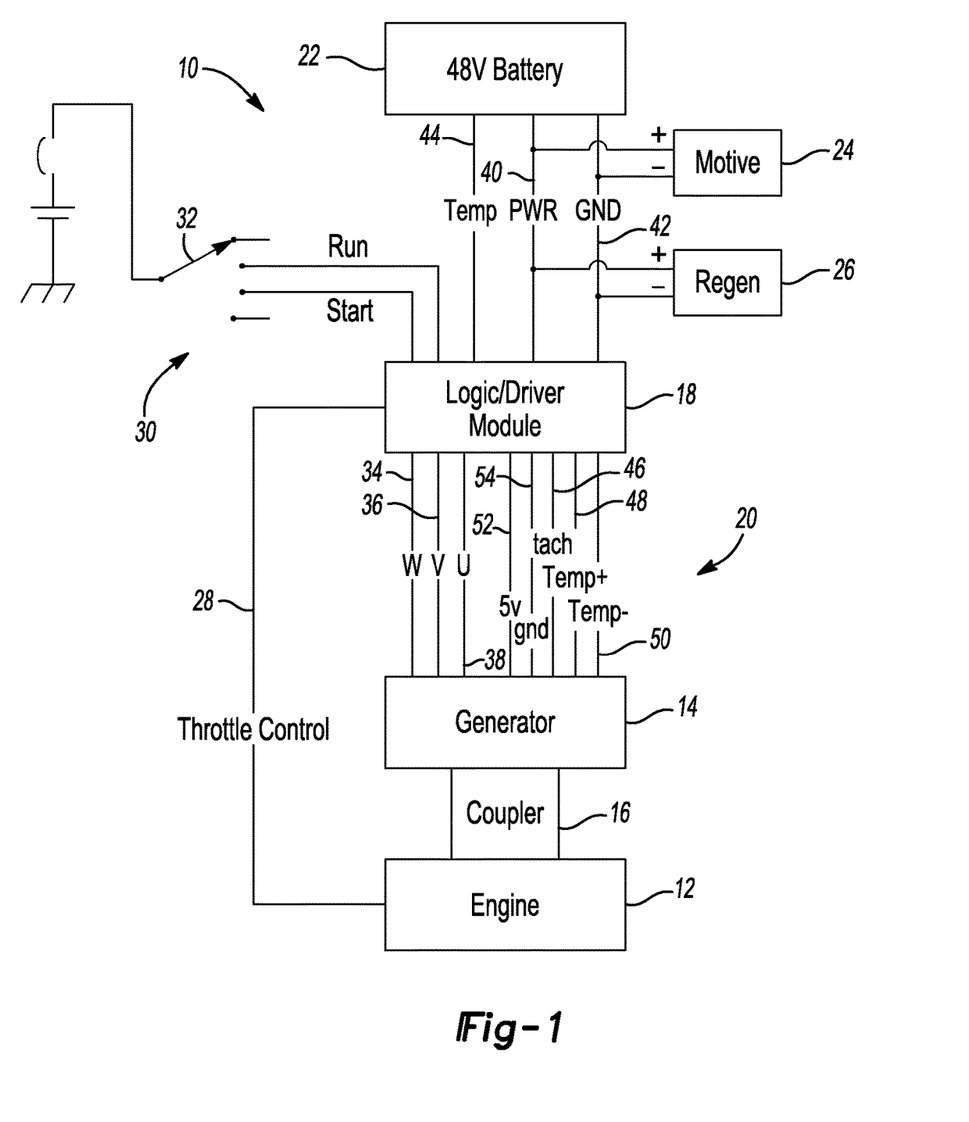
FIG. 1 is a schematic diagram illustrating a power generation system according to the principles of the present teachings.
Figure 2:
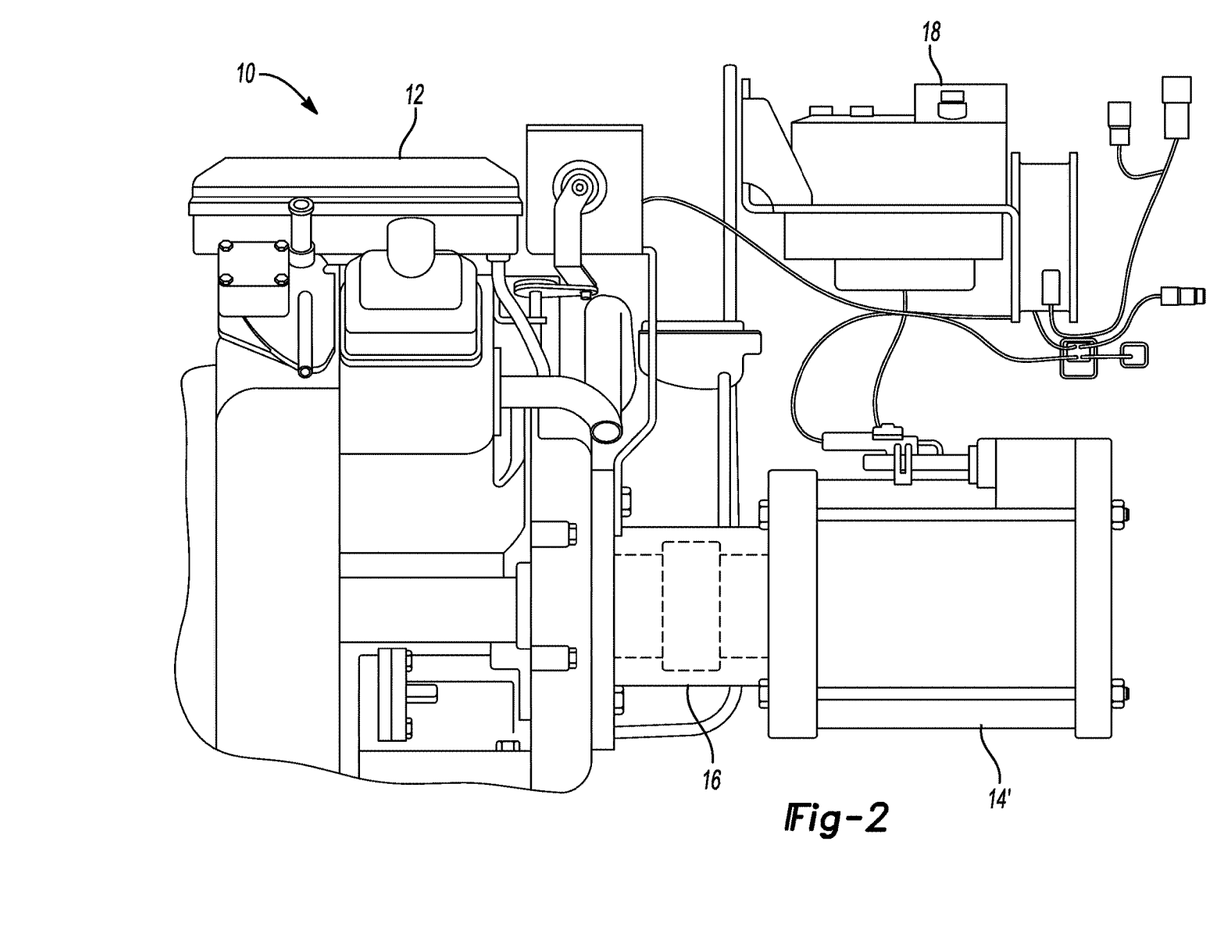
FIG. 2 is a perspective view illustrating the power generation system according to some embodiments.

With reference to FIGS. 1-2, a power generation system according to the principles of the present teachings is provided having advantageous construction and methods of use. In some embodiments, power generation system 10 can comprise an internal combustion engine 12 being coupled to a generator 14 via a mechanical coupler 16. Generator 14 can be operably coupled to a logic/driver module 18 via a plurality of connections 20, which will be described in greater detail herein. Logic/driver module 18 can be operably coupled to a battery source 22, a motive output system 24, and optionally a power regeneration system 26. It should be understood that, in some embodiments, motive output system 24 and power regeneration system 26 can be a single, unitary drive system.

Still referring to FIGS. 1-2, in some embodiments, logic/driver module 18 can be operably coupled to internal combustion engine 12 via a throttle or other control 28. Throttle 28 can be used to control or otherwise set an operational parameter of internal combustion engine 12, such as engine RPM or other controlling parameter. In some embodiments, throttle 28 can be used to set internal combustion engine 12 in any one of a number of operational settings, such as idle, full RPM (e.g. 3000 RPM), or any other predetermined condition.

In some embodiments, power generation system 10 comprises a starter and/or ignition system 30 having a switch 32 for starting and/or running logic/driver module 18 and, consequently, generator 14, internal combustion engine 12, and battery source 22.

In some embodiments, generator 14 is operably coupled to logic/driver module 18 via the plurality of connections 20. In some embodiments, the plurality of connections 20 comprises a plurality of commutator lines 34, 36, 38, which are also referenced as W, V, and U, respectively. Commutator lines 34, 36, 38 are operably coupled to logic/driver module 18 for transmitting a power output of generator 14 to logic/driver module 18. In turn, logic/driver module 18 is operable to transmit the power output received on commutator lines 34, 36, and 38 from generator 14 to battery source 22 and motive output system 24 via lines 40, 42. In some embodiments, line 40 represents a power line and line 42 represents a ground line.

In some embodiments, logic/driver module 18 is operable to serve as a controller, data hub, and/or central processing unit to monitor and control operation of power generation system 10. To this end, logic/driver module 18 can receive any one of a number of sensory inputs, such as a temperature input 44 from battery source 22. Temperature input 44 is operably coupled to battery source 22 to provide a signal indicative of an operational temperature of battery source 22 to ensure the safe and efficient operation thereof. Similarly, logic/driver module 18 can receive additional sensory inputs from generator 14, such as a tachometer input 46 and temperature inputs 48, 50. In some embodiments, tachometer input 46 can provide operational speed, in revolutions per minute, of generator 14. This can be particularly useful in monitoring the operational parameters of generator 14, including the position of commutator and/or engine speed. Furthermore, temperature inputs 48, 50, in some embodiments, can be used to monitor the operational performance and efficiency of generator 14 and/or engine 12. Lines 52, 54 can provide power source for operation of logic/driver module 18.

In some embodiments, generator 14 can comprise an AC induction motor. AC induction motor 14' can provide a number of benefits over conventional DC motors (it should be noted that reference numeral 14 will be used in the figures to denote AC induction motor 14'). For example, AC induction motor 14' is configured such that the electric current in the rotor needed to produce torque is induced by electromagnetic induction from the magnetic field of the stator winding. AC induction motor 14' does not require mechanical commutation, separate-excitation or self-excitation for the energy transferred from stator to rotor, as in conventional DC motors. Accordingly, AC induction motor 14' is configured such that logic/driver module 18 can operably control AC induction motor 14' to induce a magnetic field, thereby resulting in power output. It should be understood that AC induction motor 14' can maintain a predetermined voltage irrespective of an associated RPM (of internal combustion engine 12). In other words, during operation, logic/driver module 18 can vary a slip angle of AC induction motor 14' in order to change a resultant current output of AC induction motor 14' and thereby maintain a predetermined or regulated voltage, irrespective of RPM. This enables improved control of voltage and further reduces and/or eliminates damage to high voltage components due to overshooting voltage levels. Torque can be monitored by logic/driver module 18 to ensure load on internal combustion engine 12 is not too great.

During continued operation, if the load on internal combustion engine 12 causes the RPM of internal combustion engine 12 to decrease, then throttle 28 can be actuated by logic/driver module 18 to increase RPM of internal combustion engine 12 to an acceptable level. On the other hand, if an increase in throttle 28 is not possible/practical/permissible, then AC induction motor 14' can reduce the torque and associated load to enable internal combustion engine 12 to continue to run. In this case, the power output of AC induction motor 14' can be reduced and the additional necessary power can come from battery source 22.

When internal combustion engine 12 is set at an idle RPM state (e.g. throttle 28 is actuated to permit internal combustion engine 12 to operate at a lower power setting or otherwise idle condition), the current allowed via AC induction motor 14' is controlled by logic/driver module 18 to allow internal combustion engine 12 to run with only mild engine droop. However, if the required load is increased beyond a predetermined level, throttle 28 is actuated to adjust internal combustion engine 12 to a high RPM state. It should be understood that the load level can also be controlled using a single engine RPM level. Droop can be controlled at any level of RPM by increasing or decreasing AC induction motor torque.

In some embodiments, by monitoring the temperature of logic/driver module 18 and the temperature of AC induction motor 14', the output of AC induction motor 14' can be changed (e.g. reduced) to allow AC induction motor 14' or logic/driver module 18 to cool. In addition to controlling the output, logic/driver module 18 can also turn on or off fans for cooling. This control of AC induction motor 14' allows AC induction motor 14' to produce a wide range of voltages without changing the associated RPM of internal combustion engine 12.

Furthermore, during a regenerative power operation, if logic/driver module 18 detects a voltage rise due to regenerative power from regenerative system 26, logic/driver module 18 can reduce AC induction motor 14' output to zero and reduce internal combustion engine 12 RPM to idle. The voltage swing of the system can be controlled from 3 volt to 0.1 volt peak to peak swing.

By way of non-limiting example, in some embodiments, power generation system 10 can be operated to be responsive to varying voltage outputs in order to maintain proper operational parameters and also consume excess power developed via regenerative processes. It should be recognized that the following thresholds are merely for illustration and, thus, alternative thresholds can be used. It should also be recognized that in some embodiments some of the following specified voltages, such as first voltage, second voltage, and the like, refer to the same absolute voltage value, such that separately specified voltages can include the same absolute voltage value.

Figure 3:
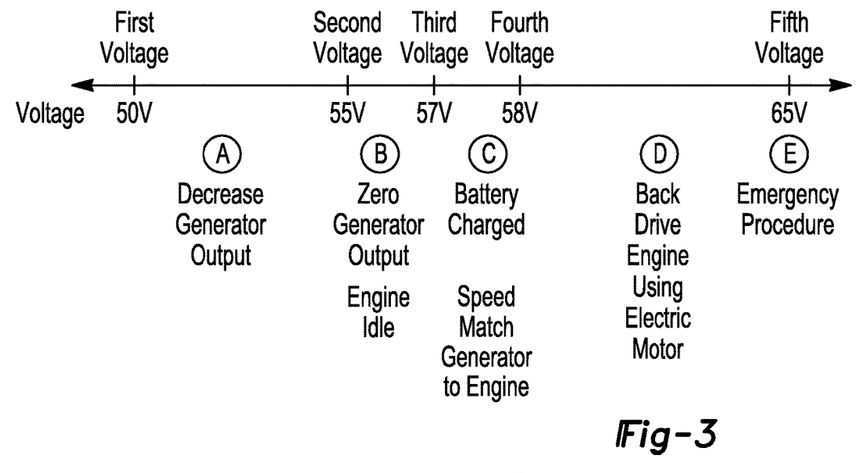
FIG. 3 is a chart illustrating various control zones in connection with the principles of the present teachings.

With reference to FIG. 3, if logic/driver module 18 detects a voltage that is between a first voltage (e.g. 50 volts) and a second voltage (e.g. 55 volts) generally indicated as Zone A, the AC induction motor 14' can continue to operate as a generator outputting power. The actual output voltage between the first voltage and the second voltage can be varied and/or maintained, if desired, by adjusting a slip angle of an AC induction motor 14' or command reverse torque a brushless DC motor 14".

If the detected voltage increases to between the second voltage (e.g. 55 volts) and a third voltage (e.g. 57 volts) generally indicated as Zone B, the output of generator 14 can be reduced to zero and act as a flywheel (e.g. free spinning) to prevent further increase of the output voltage caused by generator 14 and, additionally, internal combustion engine 12 can be reduced to idle via throttle 28. Within Zone B, battery source 22 can receive and store excess available power. It should be understood that Zone B can be reduced to any desired range, including zero.

If the detected voltage increases to between third voltage (e.g. 57 volts) and a fourth voltage (e.g. 58 volts) generally indicated at Zone C, battery source 22 is now fully charged and unable to accept or consume additional available power. At the fourth voltage, logic/driver module 18 can output a control signal to generator 14 to spin up to and generally match the associated RPM of internal combustion engine 12. During this spin-up process, power is consumed from the available power of battery source 22 and regenerative power system 26. This helps to consume excess system power being developed that can no longer be used, such as for instance to store in battery source 22 or power vehicle components. It should be understood that Zone C can be reduced to any desired range, including zero, but ideally would be greater than zero to provide an indication of a completely-charged state of battery source 22.

If the detected voltage increases above the fourth voltage (e.g. 58 volts), generator 14 can be further actuated as a motor, thereby receiving excess power from regenerative system 26 that drives generator 14, thereby consuming this excess available system power and applying a mechanical drive output to internal combustion engine 12 via mechanical coupler 16. This mechanical drive output urges internal combustion engine 12 to speed up (i.e. back drive the engine 12) and serves as a drag device and power consumption unit.

If detected voltage continues to increase above a predetermined max voltage level or fifth voltage (e.g. 65 volts), alternative systems can be used to disengage and/or power down power generation system 10 as a failsafe mechanism. Alternative systems can include mechanical braking components for the vehicle and/or power generation system.

If the detected voltage drops below the fourth voltage (e.g. 58 volts), generator 14 can once again become a flywheel with no associated power output. Likewise, if the detected voltage drops below the second voltage (e.g. 55 volts), generator 14 can once again operate as a generator outputting power.

In some embodiments, generator 14 comprises a brushless DC motor 14", with operation in connection with the remaining portions of power generation system 10 being similar to AC induction motor 14' unless otherwise noted herein (it should be noted that reference numeral 14 will be used in the figures to denote brushless DC motor 14"). Brushless DC motor 14" comprises rotor, stator, and magnets. In operation, brushless DC motor 14" is operable in response to control input from logic/driver module 18.

In some embodiments, power generation system 10 can be employed as a starter mechanism or system for starting internal combustion engine 12. In conventional internal combustion engines, a starter is mechanically coupled to a drive member of the internal combustion engine to impart a rotational force capable of initiating ignition of the engine. Conventional starters are often heavy and add unnecessary complexity and weight to the system. Once the engine is started, the starter is no longer needed until the next startup event. However, according to the principles of the present teachings, power generation system 10 can be used to provide the necessary rotational force to drive the drive member of the internal combustion engine 12 to initiate ignition of the engine 12. That is, in some embodiments, battery source 22 can be used to drive generator 14 as a motor to impart the necessary rotational force via coupler 16 to engine 12. More particularly, battery source 22 can be used to build up a sufficient magnetic impulse or charge to drive generator 14 in response to logic/driver module 18.

Generator 14 is capable of rotating engine 12 at a sufficient RPM, such as about 700-850 RPM, to introduce fuel and ignition to promote combustion and, thus, operation of internal combustion engine 12. Once engine 12 is started, generator 14 can be adjusted to act merely as a flywheel (e.g. free spinning) with no associated power output, thereby reducing an associated drag on internal combustion engine 12 during warm-up.

By way of non-limiting example, as described herein, starter and/or ignition system 30 can comprise a switch 32 for starting and/or running logic/driver module 18 and, consequently, generator 14, internal combustion engine 12, and battery source 22. Switch 32, when turned into a start position, results in logic/driver module 18 initiating the starting sequence, which causes rotation of internal combustion engine 12 to a predetermined RPM, such as 750 RPM. Once the internal combustion engine 12 increases to a higher RPM, such as 850 RPM, which indicates that internal combustion engine 12 is self-idling, logic/driver module 18 can discontinue actuating generator 14, thereby permitting generator 14 to serve as a flywheel and internal combustion engine 12 to idle. During this starting sequence and thereafter, fault detection methods can be employed, as discussed below.

Using power generation system 10, and, in particular, battery source 22, logic/driver module 18, and generator 14, permits several advantages over conventional starter-equipped configurations. By way of non-limiting example, in some embodiments, the use of the remaining components of power generation system 10 to start internal combustion engine 12 enables the elimination of conventional starters, thereby reducing costs associated with the conventional starter, the associated weight of the starter, and the reduced complexity of the starter system.

Moreover, the use of the remaining components of power generation system 10 to start internal combustion engine 12 further permits robust monitoring and fault detection of potential failure modes of internal combustion engine and related components. For example, during the initial starting procedure, if logic/driver module 18 detects a lower than anticipated current draw, the starting sequence can be terminated as a potential failure exists, such as a broken shaft, rod, or other engine component that is permitting a nearly free rotation of the engine 12. On the other hand, if logic/driver module 18 detects a higher than anticipated current draw, the starting sequence can again be terminated as a potential failure exists, such as a seized engine or other obstruction that is preventing rotation of the engine 12. Still further, due to continuous monitoring of operational parameters by logic/driver module 18, misfires or other engine abnormalities can be detected by the associated changes in operating parameters (e.g. current, voltage, etc.) within generator 14.

Figure 4:
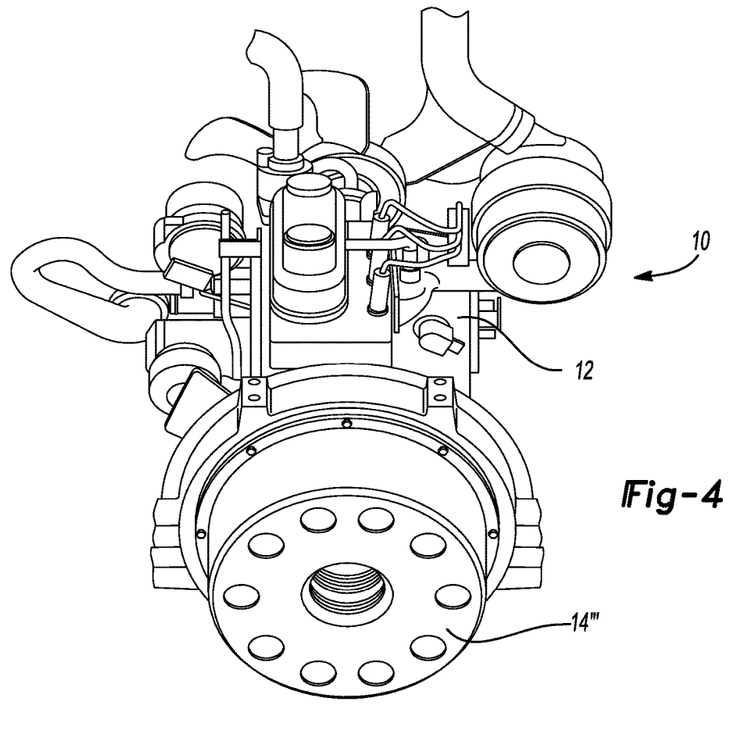
FIG. 4 is a perspective view illustrating the power generation system according to some embodiments having a frameless generator.
Figure 5A:
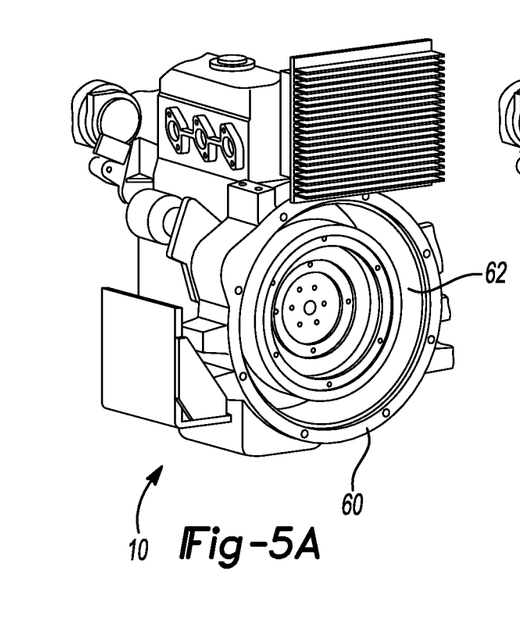
FIG. 5A is a perspective view illustrating a bell housing and flywheel according to the principles of the present teachings.
Figure 5B:
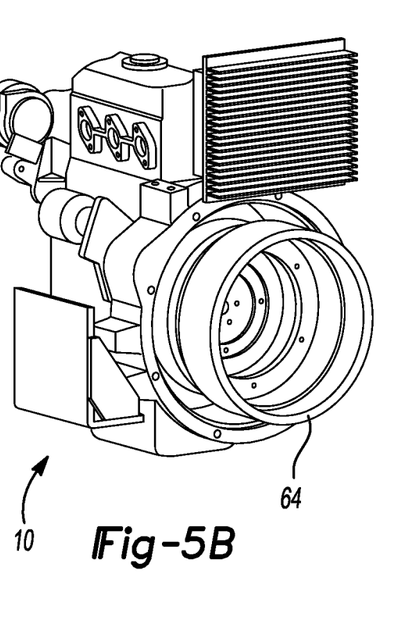
FIG. 5B is a perspective view illustrating a rotor of the frameless generator according to the principles of the present teachings.
Figure 5C:
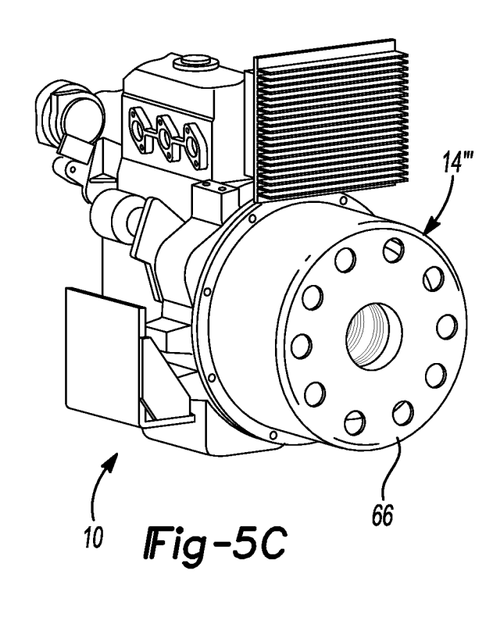
FIG. 5C is a perspective view illustrating a stator of the frameless generator according to the principles of the present teachings.

In some embodiments, as illustrated in FIGS. 4-5C, a frameless generator 14''' can be used in place of generator 14. Specifically, frameless generator 14''' can result in reduced size and weight compared to AC induction motor 14' and brushless DC motor 14''. In some embodiments, frameless generator 14''' can comprise a bell housing 60 being integrally formed or attached to a fixed portion of internal combustion engine 12, and a high inertia flywheel 62 being rotatably coupled to a crank shaft of internal combustion engine 12 for rotation therewith. A rotor 64 of frameless generator 14''' can be operably coupled with flywheel 62 for rotation therewith and an associated stator 66 of frameless generator 14''' can be fixedly coupled with bell housing 60, such that rotor 64 is rotatable relative to stator 66. Frameless generator 14''' can be operated as both a generator (e.g. being driven by internal combustion engine 12) or a motor (e.g. being driven by battery source 22 and logic/driver module 18) as described herein. It should be noted that use of frameless generator 14''' can permit the elimination of coupler 16 in some embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power generation and starting system for a utility vehicle, said system comprising:
   a battery source structured and operable to store electrical energy;
   a logic/driver module operably coupled to said battery source, said logic/driver module structured and operable to output electrical energy to a drive system of the utility vehicle;
   an internal combustion engine structured and operable to output a mechanical driving force; and
   a generator operably coupled to said internal combustion engine and electrically coupled to said logic/driver module, said generator being structured and operable as a generator in response to said mechanical driving force of said internal combustion engine, thereby outputting electrical energy to said logic/driver module, said generator further being structured and operable to as an electric motor in response to input of electrical energy from said logic/driver module to drive said internal combustion engine during a starting sequence of said internal combustion engine, wherein
   the logic/driver module is further structured and operable to detect potential operational failures of the internal combustion engine by monitoring a current draw of said generator during the starting sequence and terminating the starting sequence in response to detecting the current draw of said generator is outside a predetermined range, the current draw of said generator being outside of the predetermine range:
      in an instance in which the current draw of said generator is less than a minimum value of the predetermined range of current draw, a current draw less than the minimum value being indicative of a potential operational failure of the internal combustion engine, and
      in an instance in which the current draw of said generator is greater than a maximum value of the predetermined range of current draw, a current draw greater than the maximum value being indicative of a potential operational failure of the internal combustion engine.

2. The power generation and starting system according to claim 1 wherein said logic/driver module is structured and operable to output electrical energy to said generator to drive said internal combustion engine to a first predetermined revolutions per unit of time, said logic/driver module further being structured and operable to detect said internal combustion engine is at a second predetermined revolutions per unit of time that is greater than said first predetermined revolutions per unit of time whereby said logic/driver module ceases said outputting electrical energy to said generator.

3. The power generation and starting system according to claim 2 wherein said logic/driver module enables said generator to freely spin with said internal combustion engine following detection of said second predetermined revolutions per unit of time.

4. The power generation and starting system according to claim 1 wherein said logic/drive module controls the output of electrical energy by said battery source and the receipt of electrical energy by said battery source.

5. The power generation and starting system according to claim 1 wherein said internal combustion engine is responsive to a control input from said logic/driver module.

6. The power generation and starting system according to claim 1 wherein said generator is operably coupled to said internal combustion engine via a mechanical coupler.

7. The power generation and starting system according to claim 1 wherein said generator is an AC induction motor.

8. The power generation and starting system according to claim 1 wherein said generator is a brushless DC motor.

9. The power generation and starting system according to claim 1 wherein said generator is a frameless generator.

10. A method for starting an internal combustion engine of a utility vehicle, the utility vehicle comprising a battery source, the internal combustion engine, a generator mechanically coupled to the internal combustion engine, and a logic/drive module electrically and communicatively coupled to the battery source, the internal combustion engine and the generator, said method comprising:
   initiating a starting sequence of the internal combustion engine by providing electrical energy from the battery source to the generator, via the logic/driver module, such that the generator rotates the internal combustion engine;
   monitoring the current draw of the generator during the starting sequence, via the logic/driver module;
   monitoring the rotational speed of the internal combustion engine during the starting sequence, via the logic/driver module; and
   detecting potential operational failures of the internal combustion engine and terminating the starting sequence, via the logic/drive module, in response to detecting the current draw of the generator is outside a predetermined range, wherein the current draw is detected to be outside the predetermined range:
      in an instance in which it is detected that the current draw of the generator is less than a minimum current draw value of the predetermined range, a current draw less than the minimum value being indicative of a potential operational failure of the internal combustion engine; and
      in an instance in which it is detected that the current draw of the generator is greater than a maximum current draw value of the predetermined range, a current draw greater than the maximum value being indicative of a potential operational failure of the internal combustion engine.

11. The power generation and starting system according to claim 1, wherein the potential engine operational failure is selected from the group consisting of a broken shaft and a broken rod.

12. The power generation and starting system according to claim 1, wherein the potential operational failure is selected from the group consisting of the internal combustion engine being seized and an obstruction preventing rotation of the internal combustion engine.

* * * * *